US011807478B2

(12) United States Patent
Guidi et al.

(10) Patent No.: US 11,807,478 B2
(45) Date of Patent: Nov. 7, 2023

(54) DEVICE FOR HANDLING REELS

(71) Applicant: E80 Group S.p.A., Viano (IT)

(72) Inventors: Roberto Guidi, Viano (IT); Fabrizio Ascari, Viano (IT)

(73) Assignee: E80 GROUP S.P.A., Viano (IT)

( * ) Notice: Subject to any disclaimer, the term of this patent is extended or adjusted under 35 U.S.C. 154(b) by 308 days.

(21) Appl. No.: 17/045,693

(22) PCT Filed: Feb. 19, 2019

(86) PCT No.: PCT/IB2019/051331
§ 371 (c)(1),
(2) Date: Oct. 6, 2020

(87) PCT Pub. No.: WO2019/193431
PCT Pub. Date: Oct. 10, 2019

(65) Prior Publication Data
US 2021/0032061 A1 Feb. 4, 2021

(30) Foreign Application Priority Data
Apr. 6, 2018 (IT) ........................ 102018000004294

(51) Int. Cl.
*B65H 19/12* (2006.01)
*B66F 9/14* (2006.01)
(Continued)

(52) U.S. Cl.
CPC ............. *B65H 19/126* (2013.01); *B66F 9/12* (2013.01); *B66F 9/125* (2013.01); *B66F 9/14* (2013.01);
(Continued)

(58) Field of Classification Search
CPC ................ B65H 75/185; B65H 75/242; B65H 2301/41369; B65H 16/02; B65H 16/06; B65H 18/02; B65H 18/028; B65H 18/04; B65H 19/12; B65H 19/126; B65H 2301/4173; B65H 75/42; B65H 75/425; B66F 9/185; B66F 9/00; B66F 9/12;
(Continued)

(56) References Cited

U.S. PATENT DOCUMENTS 522,699 A * 7/1894 Twining et al. ..... B65H 75/242 242/573.5
849,091 A * 4/1907 Votey .................. B65H 75/185 242/596.7
(Continued)

FOREIGN PATENT DOCUMENTS

JP 3138769 B1 2/2001

OTHER PUBLICATIONS

International Search Report for PCT/IB2019/051331 dated May 27, 2019 (2 pages).

*Primary Examiner* — Michael R Mansen
*Assistant Examiner* — Raveen J Dias
(74) *Attorney, Agent, or Firm* — Tutunjian & Bitetto, P.C.

(57) ABSTRACT

A device for moving reels, including at least one supporting upright associable with a transport vehicle, and at least one head for manipulating the reels connected to the support upright; the manipulation head includes at least one first grip member, provided with a first terminal element adapted to grasp the reel at a first opening of its central through hole.

11 Claims, 8 Drawing Sheets

(51) Int. Cl.
*B66F 9/18* (2006.01)
*B66F 9/12* (2006.01)

(52) U.S. Cl.
CPC ................ *B66F 9/142* (2013.01); *B66F 9/18* (2013.01); *B66F 9/185* (2013.01); *B65H 2301/4173* (2013.01)

(58) Field of Classification Search
CPC .. B66F 9/122; B66F 9/125; B66F 9/14; B66F 9/142; B66F 9/143; B66F 9/144; B66F 9/146; B66F 9/18
See application file for complete search history.

(56) References Cited

U.S. PATENT DOCUMENTS 1,244,865 A * 10/1917 Krohn .................... B65H 16/06 403/370
2,271,624 A * 2/1942 Cochran ................... B66F 9/18 414/665
2,499,562 A * 3/1950 Behrens ................. B65H 19/10 242/596.1
2,512,409 A * 6/1950 Adde ........................ B66F 9/18 414/621
2,727,703 A * 12/1955 Bonnett ................. B65H 49/02 242/172
2,904,279 A * 9/1959 Ewing .................. G03B 17/305 242/573.2
2,908,452 A * 10/1959 Jacobsen .............. B65H 75/242 242/573.4
2,962,241 A * 11/1960 Campbell .............. B65H 49/26 242/596.1
2,985,292 A * 5/1961 Beaudoin ............. B65H 75/185 206/389
2,991,953 A * 7/1961 Paterson .............. B65H 19/126 242/563.2
3,018,977 A * 1/1962 Skallquist ............ B65H 75/242 279/2.24
3,037,651 A * 6/1962 Smith ....................... B66F 9/18 250/222.1
3,104,023 A * 9/1963 Smith ....................... B66F 9/18 414/621
3,118,555 A * 1/1964 Bent ......................... B66C 1/46 294/98.1
3,143,233 A * 8/1964 Evans ..................... B66F 9/125 414/620
3,306,551 A * 2/1967 Martin ................. B65H 23/063 242/559.3
3,321,147 A * 5/1967 Martin ................. B65H 19/126 242/596.1
3,519,216 A * 7/1970 Rienzi .................... B65H 75/30 242/599.2
3,730,368 A * 5/1973 Dalglish ................... B66F 9/18 414/626
3,734,328 A * 5/1973 Dalglish ............... B21C 47/242 414/626
3,880,305 A * 4/1975 Van Polen ........... A01D 87/127 294/107
3,908,846 A * 9/1975 Brummitt ............ A01D 87/127 294/107
3,926,318 A * 12/1975 Kister ..................... B66F 9/065 414/11
4,005,793 A * 2/1977 Smith ..................... B21C 47/24 414/785
4,024,970 A * 5/1977 Schirer ................ A01D 87/127 414/24.6
4,049,140 A * 9/1977 Roose .................. A01D 87/127 294/107
4,066,270 A * 1/1978 Elkin .................. B23B 31/4046 279/2.15
4,090,624 A * 5/1978 Krein ................... A01D 87/127 414/908
4,095,706 A * 6/1978 Schwien .............. A01D 87/127 414/24.6
4,149,682 A * 4/1979 Gustafson ............ B65H 75/242 242/573
4,154,470 A * 5/1979 Dalglish ................... B66C 1/54 294/93
4,564,325 A * 1/1986 Ackerman ........... A01D 87/127 414/24.5
4,594,041 A * 6/1986 Hostetler ............. A01D 87/127 414/684
4,600,163 A * 7/1986 Hummel ............. B65H 75/185 242/588
4,687,244 A * 8/1987 Cullen ...................... B66C 1/54 294/93
4,693,433 A * 9/1987 Martin ................... B65H 23/02 188/38
4,722,651 A * 2/1988 Antal ................... A01D 87/127 414/24.5
4,893,763 A * 1/1990 Wales .................... B65H 75/08 242/534
5,060,878 A * 10/1991 Hutzenlaub ............ B65H 23/02 242/129.51
5,135,179 A * 8/1992 Morano ............ A47K 10/3836 242/565
5,238,352 A * 8/1993 Abe ..................... B65H 19/126 414/908
5,281,068 A * 1/1994 Bruce .................. A01D 87/127 414/920
5,308,217 A * 5/1994 Pienta ..................... B21C 47/24 414/610
5,344,089 A * 9/1994 Crowley ............. B65H 26/025 242/417
5,472,153 A * 12/1995 Crowley ............. B65H 16/106 242/420.6
5,492,280 A * 2/1996 Corres ................... D01H 9/187 242/130
5,509,770 A * 4/1996 Burenga .............. A01D 87/127 D15/28
5,513,944 A * 5/1996 Cullen .................... B66F 9/185 414/908
5,562,392 A * 10/1996 Raben ....................... B66F 9/12 414/664
5,651,511 A * 7/1997 Crowley ................ B65H 75/08 242/420.3
5,662,449 A * 9/1997 Krinhop ............... A01D 87/127 414/24.5
5,895,197 A * 4/1999 McVaugh ................. B66C 1/66 414/911
5,938,392 A * 8/1999 Duck ................... A01D 87/127 414/24.5
6,030,496 A * 2/2000 Baggot .............. B65H 19/1852 162/111
6,123,285 A * 9/2000 Border ................ B65H 75/242 242/573.1
6,394,732 B1 * 5/2002 Sweezey .............. A01D 87/122 414/24.5
6,440,268 B1 * 8/2002 Baggot .................. B65H 16/10 162/120
6,536,706 B1 * 3/2003 St. Germain ........ B65H 19/126 242/559.1
6,733,608 B1 * 5/2004 Baggot .............. B65H 19/1836 242/555.3
6,789,995 B1 * 9/2004 Manzi ..................... B66F 9/065 414/910
9,630,803 B2 * 4/2017 Boss ...................... B65H 49/32
9,682,842 B2 * 6/2017 Takagawa ............ B65H 75/446
9,896,316 B2 * 2/2018 Gonzales .................. B66F 9/18
10,077,166 B2 * 9/2018 Honda ................. B65H 75/242
10,212,887 B2 * 2/2019 Ramer ................... A01D 90/08
11,124,931 B2 * 9/2021 Shea ..................... B32B 43/006
2002/0054811 A1 * 5/2002 Lofgren ................ B21C 47/242 414/910
2005/0224627 A1 * 10/2005 Stolyar ................ B65H 16/103 242/571.6
2007/0075180 A1 * 4/2007 Morand ............... B65H 75/185 242/596.7

(56) References Cited

U.S. PATENT DOCUMENTS

2009/0194629 A1* 8/2009 Huang .................. B65H 75/24 242/396.5
2009/0256023 A1* 10/2009 Murase ................ B65H 75/242 242/573.9
2012/0032021 A1* 2/2012 Morinaga .............. B65H 75/08 242/577
2012/0236141 A1* 9/2012 Takagawa ............ B65H 75/425 348/95
2014/0027558 A1* 1/2014 Kawauchi ............ B65H 49/328 242/571
2014/0061350 A1* 3/2014 Maruyama ............ B41J 33/003 242/160.3
2015/0150422 A1* 6/2015 Ochoa, Sr. ........... B65H 75/185 242/596.7
2016/0130110 A1* 5/2016 Honda ................. B65H 75/242 242/574
2016/0167907 A1* 6/2016 Meyer .................... B65H 75/22 242/571.2
2016/0176690 A1* 6/2016 Iotti ........................ B66F 9/146 414/667
2017/0008728 A1* 1/2017 Takagawa ............ B65H 75/446
2017/0225492 A1* 8/2017 Culubret .............. B65H 19/126
2018/0002126 A1* 1/2018 Gonzales ................ B66F 9/063
2018/0002127 A1* 1/2018 Gonzales ............. B65H 19/126
2018/0002151 A1* 1/2018 Gonzales .................. B66F 9/18
2018/0014367 A1* 1/2018 Ginn ......................... B66F 9/18
2018/0065827 A1* 3/2018 Nelson ................. B65H 75/241
2018/0118502 A1* 5/2018 Ferguson ............. B65H 75/185
2019/0023525 A1* 1/2019 Van Deurse ....... B65H 75/4484
2020/0307949 A1* 10/2020 Sulik .................... B65H 75/185
2021/0115631 A1* 4/2021 Shea ..................... B32B 43/006
2021/0261380 A1* 8/2021 Jennings ................ B65H 16/04
2022/0041391 A1* 2/2022 Lazzarin .............. B65H 19/126
2022/0081248 A1* 3/2022 Benichou ............. B65H 49/321
2023/0011974 A1* 1/2023 Flavio .................... B65H 23/06

* cited by examiner

DEVICE FOR HANDLING REELS

TECHNICAL FIELD OF THE INVENTION

The present invention relates to a device for moving reels.

PRIOR STATE OF THE ART

Currently the reels of a fairly large size, for example reels of paper or other material, are moved by forklifts, AGVs (Automated Guided Vehicles), or other similar vehicles that are equipped with devices for picking, moving or handling, and depositing the reels themselves.

Reels are commonly picked, handled and deposited, for example, for storage or warehousing reasons, or even for the positioning on unwinding machines, or on other machines of various types that use these reels in a given production line.

Currently, the devices for moving reels are basically divided into two categories.

The devices belonging to the first category are those with grippers.

A device of this type comprises a manipulation head provided with two opposing grippers operated—for example via a hydraulic system—to move mutually closer so as to clamp the reel at its lateral surface: clamping occurs by means of the terminal contact elements (also called pads) of the grippers, which exert a pressure such as to generate enough friction to ensure a firm grip of the reel.

Precisely because of their operating principle, the devices of the type with grippers have various drawbacks.

In fact, as a consequence of the need to apply a certain radial pressure to obtain a suitable friction for a firm grip, the device can cause damage or deformation of the reel, which may also affect subsequent processing operations.

In addition, there is a significant risk that the reel may slip if the friction is not sufficient or if the friction decreases for some reason, for example because of damage or deformation of the reel.

Again, due to the fact that this device operates by friction, it is greatly affected by the surface conditions of the reel and/or of the gripper profiles: this often requires the use different versions of grippers and/or profiles depending on the characteristics of the reel, and specific calibrations are sometimes necessary in relation to the operating mode.

Devices of this type are capable of picking or depositing the reels, in both their vertical and horizontal axis orientation, allowing also their storage on several levels in the warehouse.

However, the picking of reels oriented with horizontal axis may require the use of suitable shaped supports which allow the entry of one of the grippers below the reel itself, or the use of special grippers with asymmetric arms.

In addition, with devices of this type, the minimum dimensions of the reels which can be moved are limited and it is not normally possible to be able to move just the core of the reel, i.e. the tubular support element around which the material of the reel itself is wound.

The second category of devices is that of the type comprising a manipulation head provided with a pivot which is adapted to be inserted in the central hole of the reel (or in the central hole of the reel core).

As may be easily understood, this system limits the possibility of picking and depositing to the reels which are oriented with a horizontal axis: it is therefore not usable for stacking reels in the warehouse.

Moreover, since the movement is performed by means of a pivot coaxial to the reel, the interfacing between the reel and the picking and depositing areas may only take place according to such orientation.

A further problem which is typical of all the known types of devices for moving reels is the fact that the bulk of the moving parts outside the reel (be they the lateral clamping grippers lateral or the pivot which is inserted into the central hole) does not allow to exploit all available space, especially during object storage in the warehouse.

Therefore, in summary, the known types of handling devices have the specific drawbacks which make them unusable in certain application solutions: therefore, the user is often forced to adopt multiple different devices for different moving requirements.

SUMMARY OF THE INVENTION

The technical aim of the present invention is to improve the state of the art in the field of devices for moving reels.

Within such technical aim, it is an object of the present invention to provide a device for moving reels with improved versatility compared to known-type devices.

Another object of the present invention is to provide a device for moving reels that can be used in various situations, without being affected by the surface characteristics of the coils, by the size of the same and/or by any other parameters characterizing the objects to be moved.

Another object of the present invention is to make available a device that may be used for moving, picking, depositing and/or storing reels, regardless of their vertical or horizontal axis.

A further object of the present invention is to provide a device for moving reels whose use does not involve any risk of damage to the surface of the manipulated object.

Another object of the present invention is to make available a device for moving reels which allows to make the most of available space, especially during storage operations in the warehouse.

This aim and these objects are achieved by the device for moving reels according to the present application.

The device comprises at least one support upright associable with a transport vehicle, and at least one manipulation head of the reels connected to the support upright.

According to one aspect of the invention, the manipulation head comprises at least one first grip member, provided with a first terminal element adapted to grasp said reel at a first opening of its central through hole.

According to another aspect of the invention, the first terminal element can be expanded, with variable conformation between an inactive configuration, in which it can freely be inserted in the first opening of the central through hole of the reel, and an operative configuration, in which is expanded so as to exert a friction grip action on the internal surface of the central through hole.

Moreover, according to a further aspect of the invention, the manipulation head comprises a second grip member, provided with a second terminal element adapted to grasp the reel at the second opening of its central through hole, opposite to the first opening.

The second grip member is movable between an inactive position of minimum bulk and an operative position in which the second terminal element is coaxial to the first terminal element.

The present application refers to preferred and advantageous embodiments of the invention.

BRIEF DESCRIPTION OF THE DRAWINGS

The features of the invention will be better understood by anyone skilled in the art from the description below and the accompanying drawings, given as a non-limiting example, wherein.

DETAILED DESCRIPTION OF THE INVENTION

Figure 1:
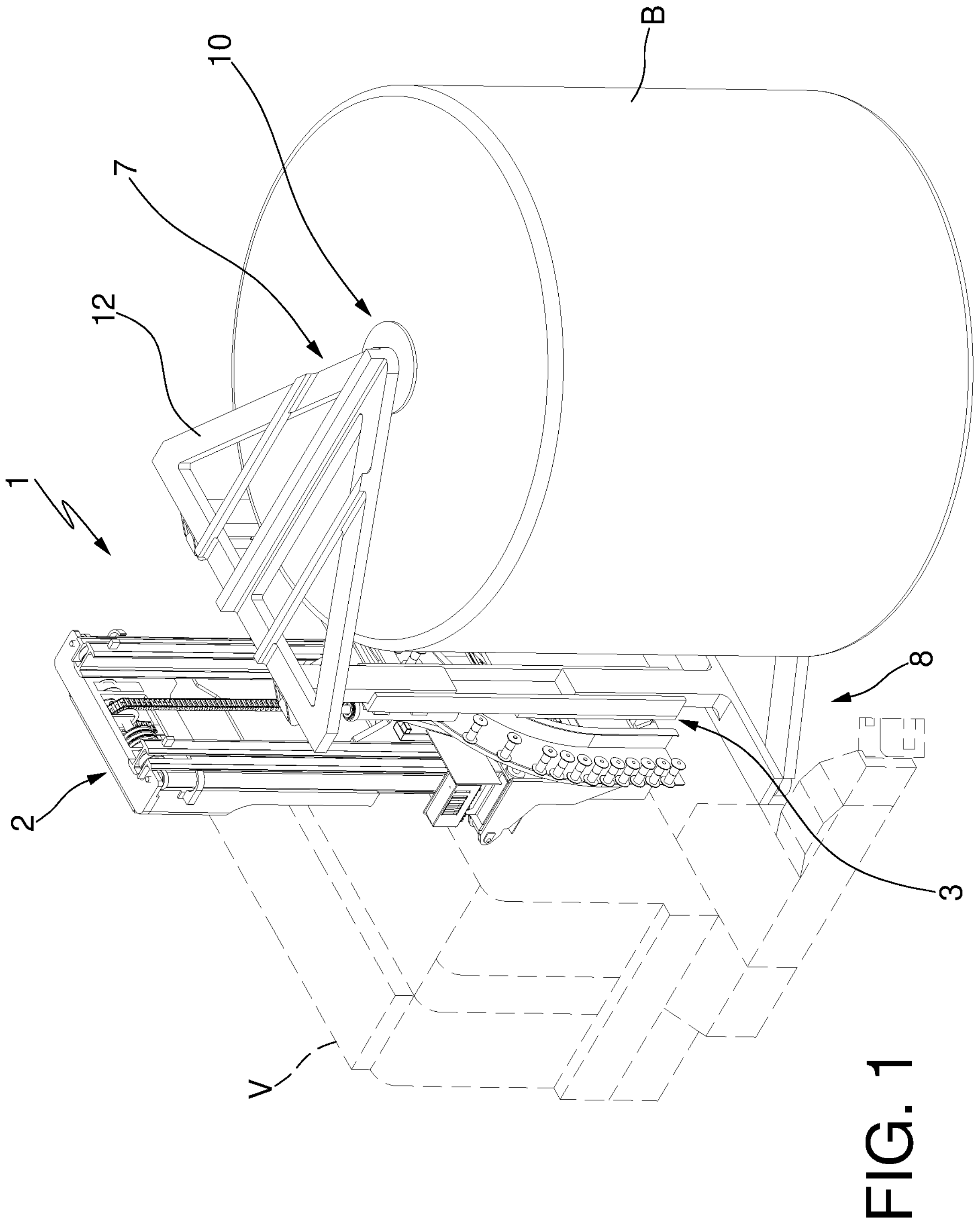
FIG. 1 is an axonometric view of the device according to the invention, mounted on a transport vehicle (represented with a discontinuous line), and carrying a reel with vertical axis orientation.

With reference to the attached FIG. 1, a device for moving reels B according to the present invention is wholly indicated with 1.

The device 1 can be associated, for example, to a transport vehicle V constituted, for example, by a forklift, an AGV (Automated Guided Vehicle), or another type of similar vehicle.

The specific type of vehicle V is not, however, a limitation for the purposes of the present invention.

The device 1 comprises a support upright, generally designated by 2.

The support upright 2 is associable (for example, in a removable manner) to specially dedicated parts of the vehicle V.

Moreover, the device 1 comprises at least one manipulation head of the reels B, generally designated by 3.

The manipulation head 3 is connected to the upright 2; in particular, the connection between the head 3 and the upright 2 is carried out on the opposite side with respect to the connection area between the upright 2 itself and the transport vehicle V.

Figure 4:
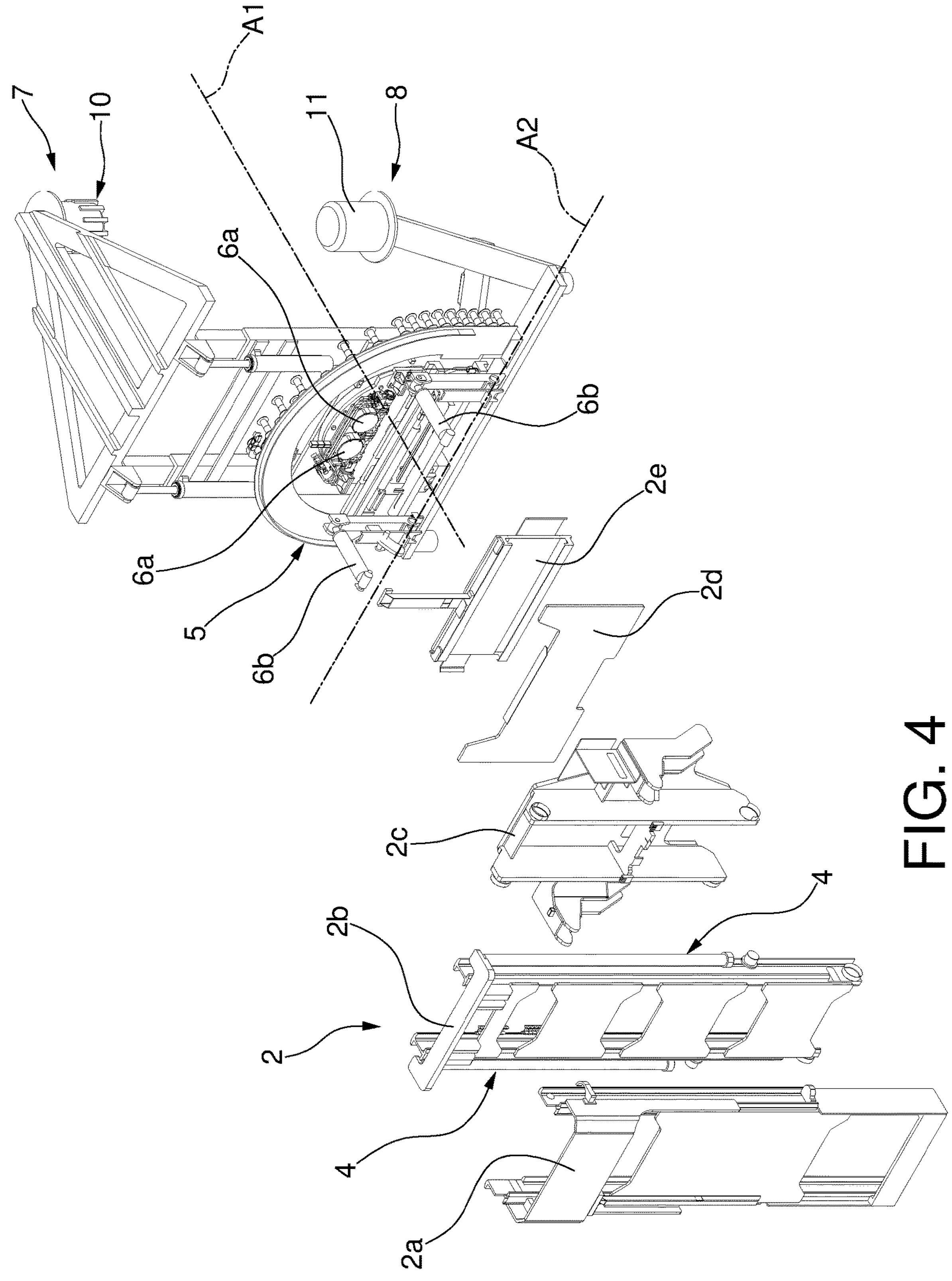
FIG. 4 is an exploded perspective view of the device.
Figure 5:
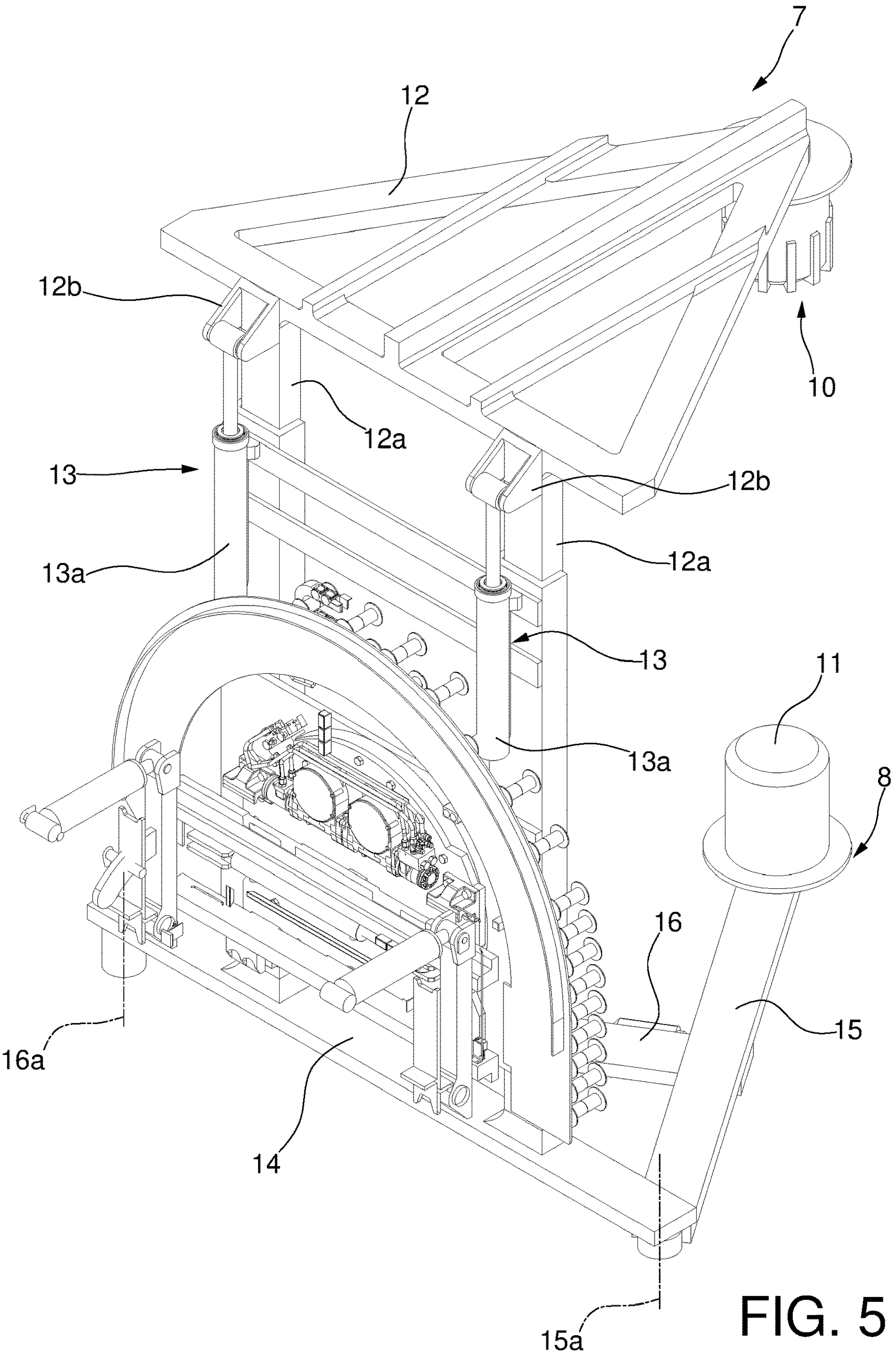
FIG. 5 is a detail of FIG. 4.

The upright 2 comprises vertical translation means 4 of the manipulation head 3 (see for example the exploded view of FIG. 4).

The vertical translation means 4 allow to place the manipulation head 3 at the desired height, for example to perform picking operations, storage operations etc.

The vertical translation means 4 can be of any type suitable to the application; for example, the vertical translation means 4 may be of the type with hydraulic actuation.

According to a possible embodiment of the invention, illustrated in the figures, the support upright 2 may comprise, for example, a first portion 2*a* for connection to the transport vehicle V, a second portion 2*b* carrying the vertical translation means 4, and further portions 2*c*, 2*d*, 2*e* for coupling to the manipulation head 3.

In other possible embodiments, the support upright 2 may have a structure and/or configuration different from the ones shown in the accompanying figures, but in any case suitable to determine the vertical translation of the manipulation head 3 to the desired height.

The support upright 2 further comprises a system of actuators, generally designated by 5, which allow to orientate and/or position the manipulation head 3 in the desired manner.

For example, the system of actuators 5 may comprise first actuators 6*a* that allow to rotate the manipulation head 3 about a first horizontal axis A1.

Moreover, the system of actuators 5 may comprise second actuators 6*b* that allow to rotate the manipulation head 3 around a second horizontal axis A2, orthogonal to the first horizontal axis A1.

The first actuators 6*a* and the second actuators 6*b* can be for example of the hydraulically actuated type, or also of any other suitable type (for example, of the electrically actuated type).

According to one aspect of the invention, the manipulation head 3 comprises a first grip member 7.

The first grip member 7 is suitable to grasp the reel B at a first opening B2 of its central through hole B1.

Furthermore, the manipulation head 3 comprises a second grip member 8.

The second grip member 8 is suitable to grasp the reel B at the second opening B3 of its central through hole B1.

The manipulation head 3 comprises a central support 9, to which the first grip member 7 and the second grip member 8 are associated.

In more detail, the first grip member 7 and the second grip member 8 are associated to the central support 9 so as to be mutually opposed.

The first grip member 7 comprises a respective first terminal element 10.

The first terminal element 10 is suitable to grasp the reel B at a first opening B2 of its central through hole B1.

Moreover, the second grip member 8 comprises a respective second terminal element 11.

The first terminal element 10 is shaped so as to be able to be inserted into the first opening B2 of the central through hole B1 of the reel B, with a certain tolerance.

Figure 7:
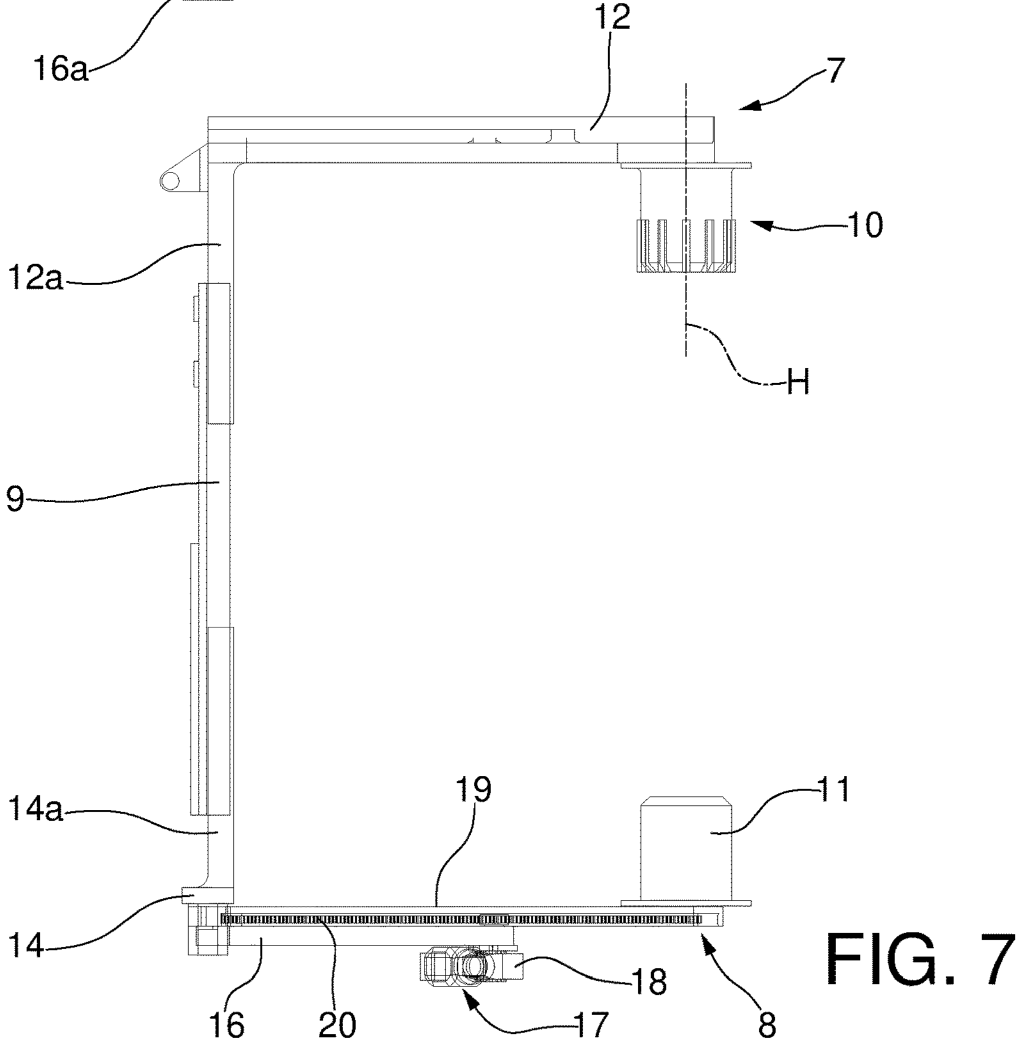
FIG. 7 is a side elevation view of the manipulation head in the configuration of FIG. 6.
Figure 9:
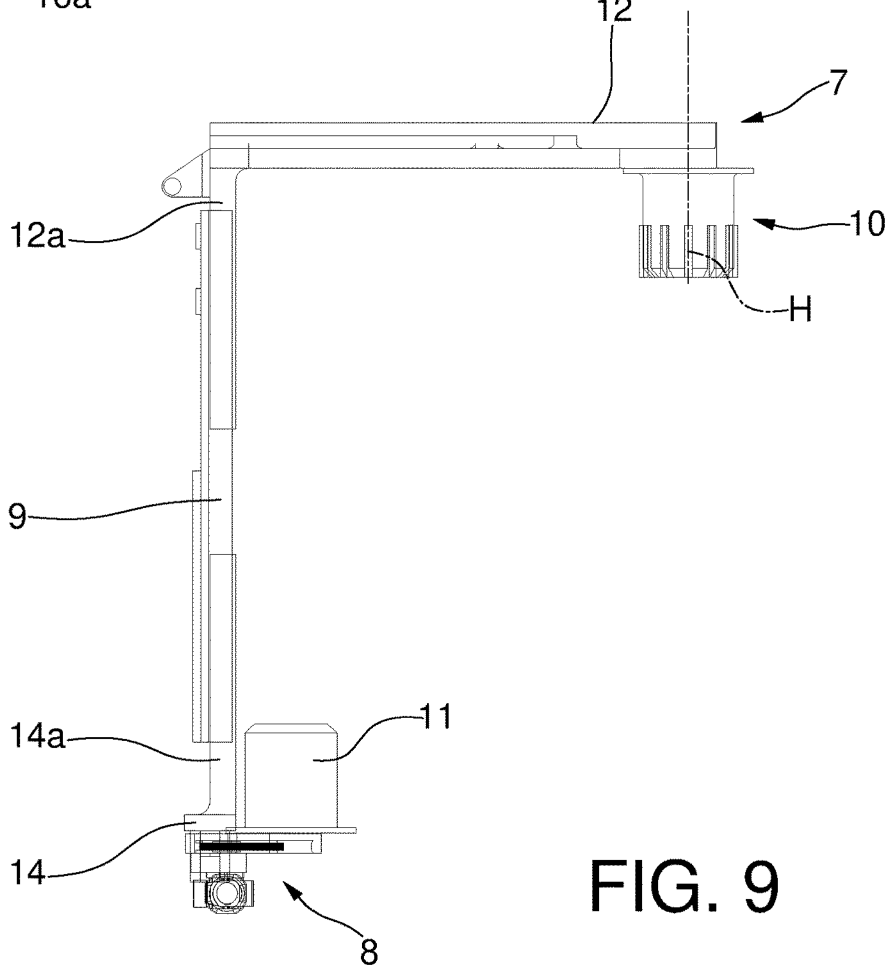
FIG. 9 is a side elevation view of the manipulation head in the configuration of FIG. 8.

The first terminal element 10 defines a respective operative axis H (FIGS. 7, 9).

The second terminal element 11 is shaped so as to be able to be inserted into the second opening B3 of the central through hole B1 of the reel B, with a certain tolerance.

According to a further aspect of the invention, at least the first terminal element 10 is expandable.

In more detail, the first terminal element 10 has a shape that is variable between an inactive configuration, in which it can freely enter into the first opening B2 of the central through hole B1, and an operative configuration, in which it is expanded so as to exert a friction grip action on the internal surface of the central through hole B1.

The aforesaid pressure, exerted by the first terminal element 10, is such as to generate a friction sufficient to allow the first grip member 7, if necessary, to independently lift the reel B, as clarified hereinafter.

In one embodiment of the invention—shown in the accompanying figures—the second terminal element 11 has a configuration which does not vary in the different operative situations.

In other embodiments of the invention, however, also the second terminal element 11 could be expandable, as described with reference to the first terminal element 10.

The second terminal element 11 has a cylindrical or substantially cylindrical conformation, with such a diameter so as to allow its insertion in said second opening B3 of the central through hole B1, with a certain tolerance.

The first terminal element 10 can be realized through different technical solutions.

According to a first technical solution, the first terminal element 10 comprises a body 10*a* with a cylindrical or substantially cylindrical conformation, provided with a plurality of expandable peripheral elements 10*b*.

Figure 11A:
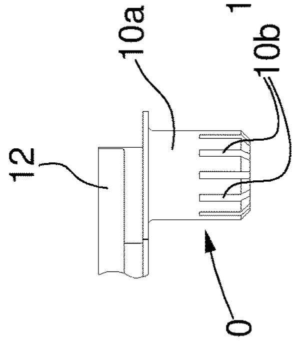
FIG. 11A is a side view of the first expandable terminal element of the first grip member, in the inactive configuration.
Figure 11B:
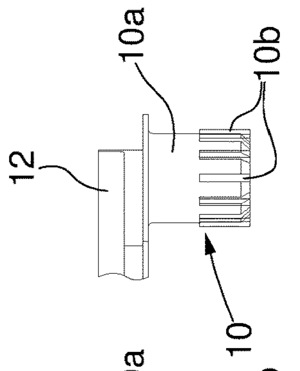
FIG. 11B is a side view of the first expandable terminal element of FIG. 11A, in the operative configuration.

The expandable peripheral elements 10*b* are movable in the radial direction—between an inactive configuration (FIG. 11A), in which they are fully accommodated within the body 10*a* (i.e. not protruding with respect to the outer surface of the body 10*a*), to an operative configuration (FIG. 11B), in which they partially protrude from the body 10*a* (i.e. protruding with respect to the outer surface of the body 10*a*).

The actuation of the expandable peripheral elements 10*b*, in their displacement between the two above configurations, can occur according to any mode suiting the needs of the present technical application.

For example, the actuation of the peripheral elements 10*b* can be obtained with a mechanical, or hydraulic, or pneumatic, or electrical actuator, or even a hybrid actuator or system including any of the previous (for example electromechanical, electro-hydraulic, etc.).

Figure 12A:
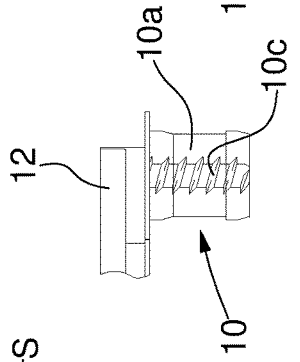
FIG. 12A is a side view of the first expandable terminal element of the first grip member, in the inactive configuration, according to another embodiment of the invention.
Figure 12B:
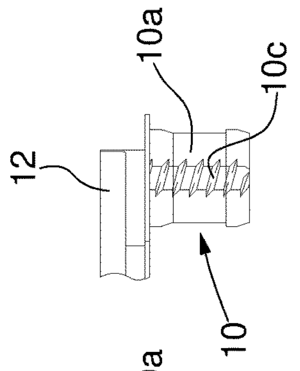
FIG. 12B is a side view of the first expandable terminal element of FIG. 12A, in the operative configuration.
Figure 10:
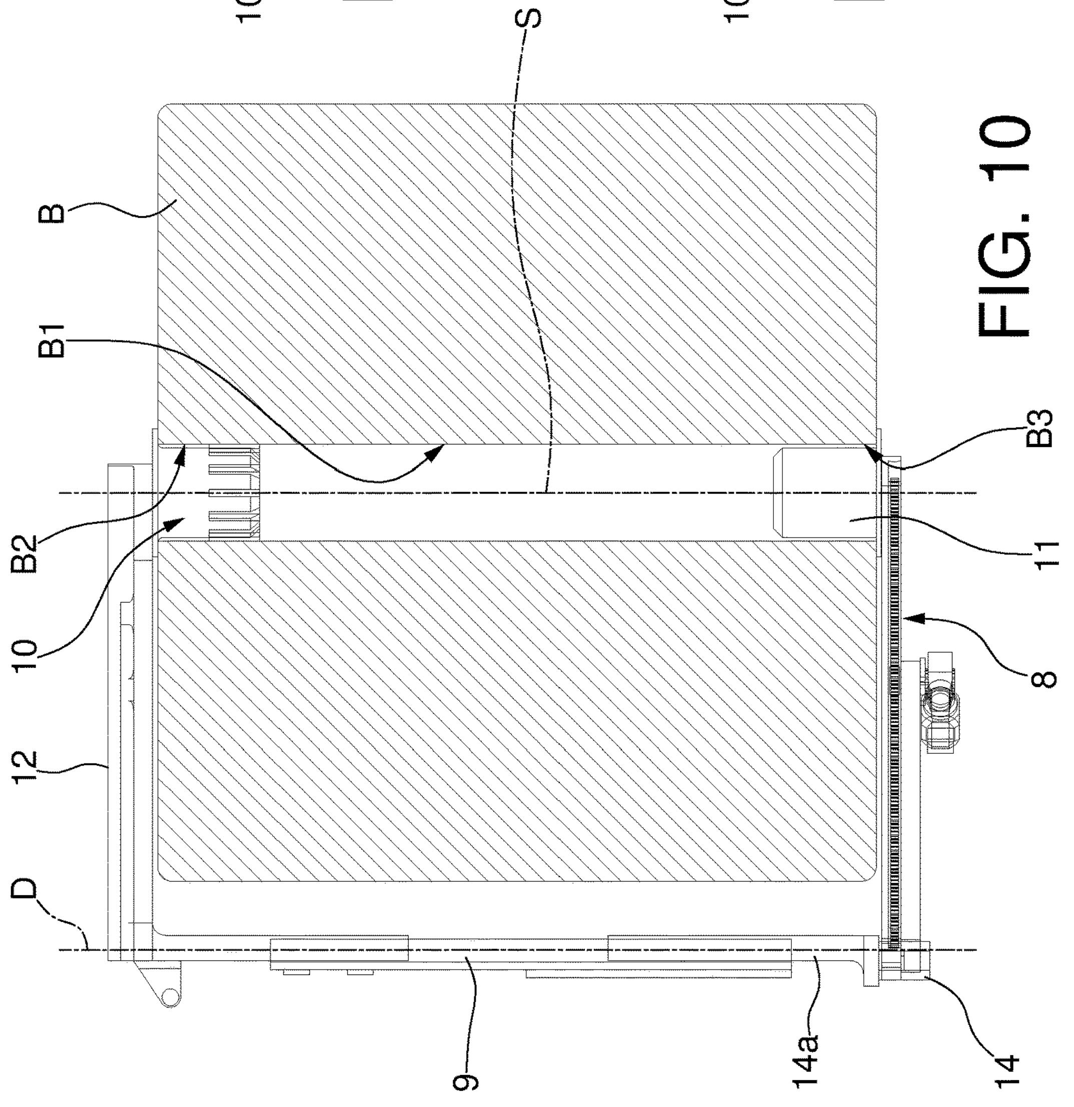
FIG. 10 is a partially sectional, side elevation view of the manipulation head of the device grasping a reel.

In a possible alternative embodiment of the invention illustrated in FIGS. 12A, 12B, the first terminal element 10 comprises a body 10*a* and an actuating screw 10*c*, engaged in a central hole provided in the body 10*a*; the rotation of the screw 10*c* causes a radial expansion of the body 10*a*, so as to obtain the desired pressure on the internal surface of the central through hole B1.

More generally, the first terminal element 10 may have any other configuration/shape suitable to obtain the expansion of at least a portion of its outer surface, so as to obtain the desired pressure on the internal surface of the central through hole B1.

The first grip member 7 comprises a cantilever element 12, to which the first terminal element 10 is fixed.

The cantilever element 12 is associated to the central support 9.

In more detail, the cantilever element 12 is movable with respect to the central support 9; The cantilever element 12 can translate with respect to the central support 9, according to direction D.

The translation direction D of the cantilever element 12, with respect to the central support 9, is parallel to the axis of symmetry S of the reel B, when the latter is grasped by the first, second grip member 7, 8.

The cantilever element 12 may have any shape suitable for the application.

In the specific embodiment shown in the figures, the cantilever element 12 has a substantially triangular shape, in which one of the vertices is associated to the first terminal element 10.

In correspondence of the opposite side to the vertex for connection to the first terminal element 10, the first cantilever element 12 comprises two first extensions 12*a* for the connection to the central body 9.

In more detail, the first extensions 12*a* are engaged in respective guide grooves 9*a* provided in the central support 9.

According to another aspect of the invention, the cantilever element 12 is associated with first translation means 13 along the aforementioned direction D.

The first translation means 13 comprise, for example, actuators 13*a* fixed to the central support 9 and connected to the cantilever element 12 in respective connection points 12*b*.

The actuators 13*a* are, for example, of the hydraulic type, but they could be of any other type suitable for the application.

Figure 6:
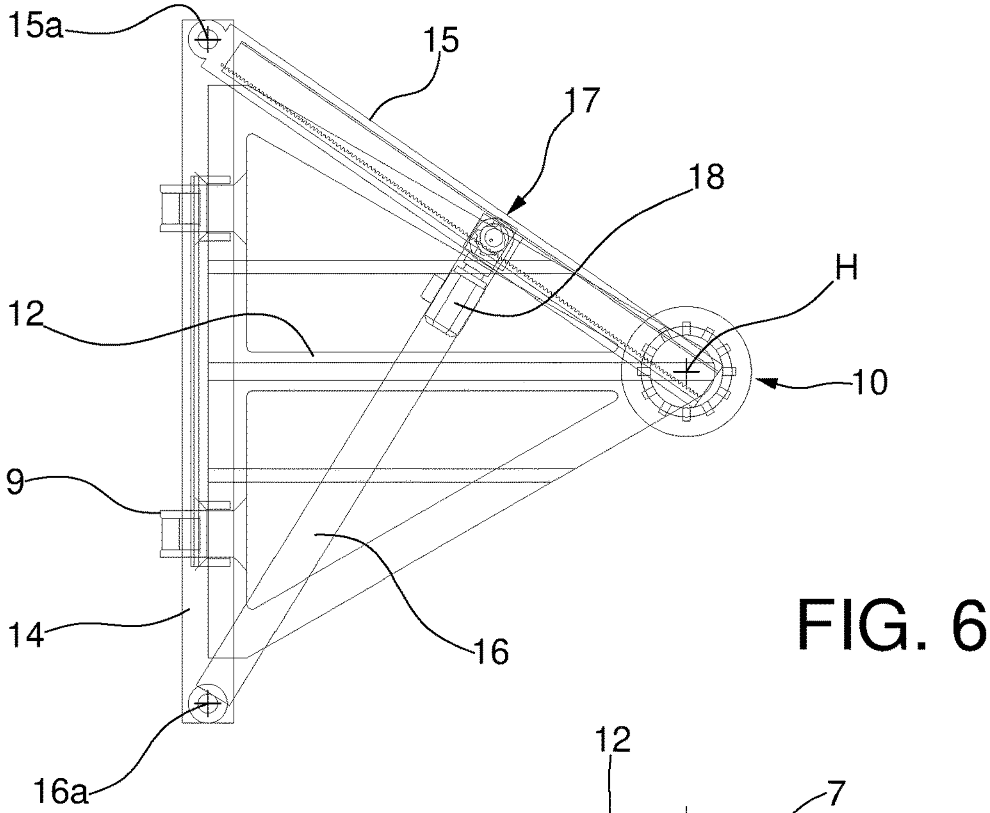
FIG. 6 is a plan view of the manipulation head of the device with the second grip member in the respective operative position.
Figure 8:
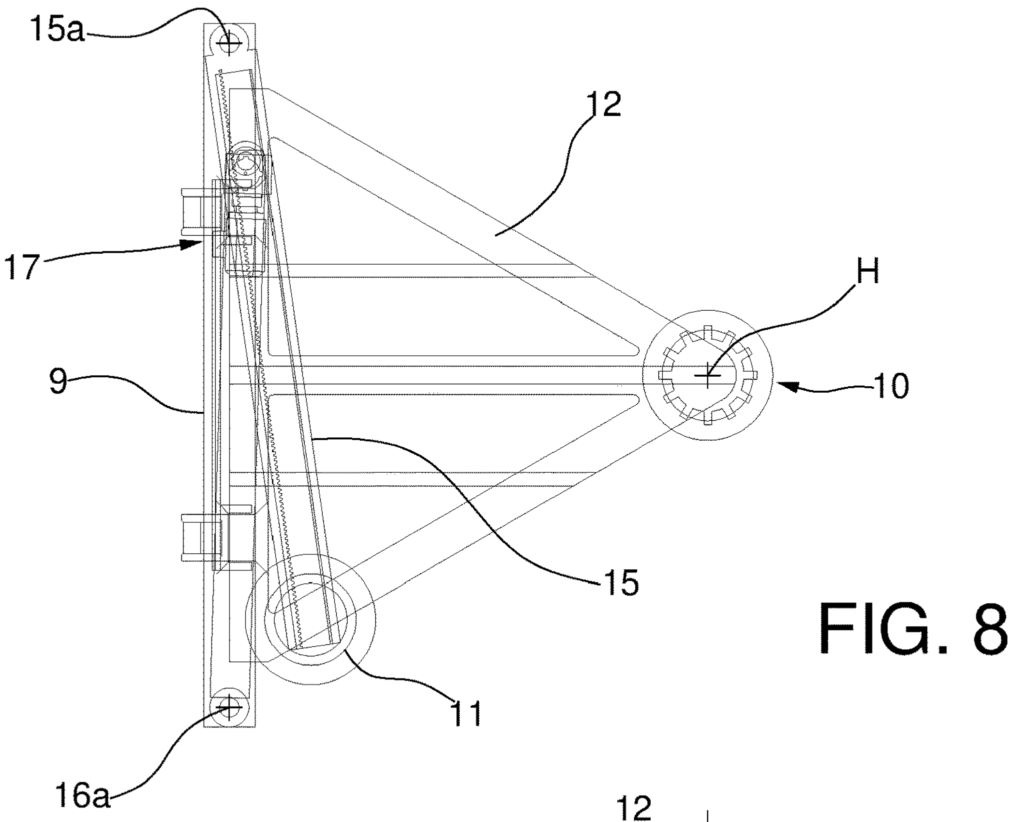
FIG. 8 is a plan view of the manipulation head of the device with the second grip member in the respective inactive position.

According to one aspect of the invention, the second grip member 8 is movable between an inactive position (FIGS. 8, 9) and an operative position (FIGS. 6, 7), as will be better explained hereinafter.

In particular, the inactive position is of minimum bulk, while in the operative position the second terminal element 11 is coaxial to the operative axis H of the first terminal element 10.

The inactive position of minimum bulk enables the device to grasp the reels only with the first terminal element 10; This is necessary for the picking/deposit of reels B with vertical axis orientation, as better described in the following.

The second grip member 8 comprises a movable frame 14, to which the second terminal element 11 is associated.

The movable frame 14 is in turn associated to the central support 9.

More in detail, the movable frame 14 can translate with respect to the central support 9, according to direction D.

The movable frame 14 comprises respective second extensions 14*a* for the connection to the central body 9; In more detail, the second extensions 14*a* are engaged in respective guide grooves 9*a* provided in the central support 9.

The second grip member 8 also comprises a first arm 15 and a second arm 16, mutually connected and both connected to the movable frame 14.

In particular, in the operative position (FIGS. 6, 7), the first arm 15 and second arm 16 are projectingly positioned with respect to the movable frame 14; in this way, they constitute a substantially triangular support structure similar to the shape of the first cantilever element 12.

In the inactive position (FIGS. 8, 9), instead, the first arm 15 and second arm 16 are substantially bent on the movable frame 14, so as to minimise their bulk, for reasons which will become clearer in the following.

Figure 3:
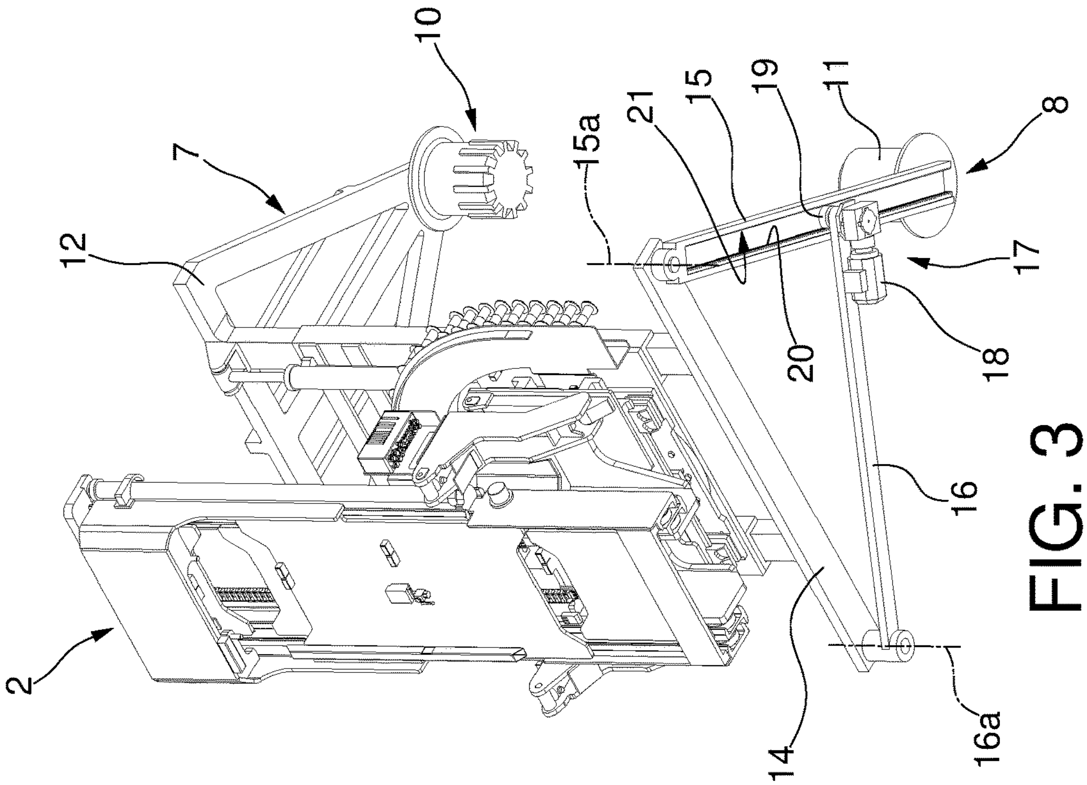
FIG. 3 is another perspective view of the device from a different angle.
Figure 2:
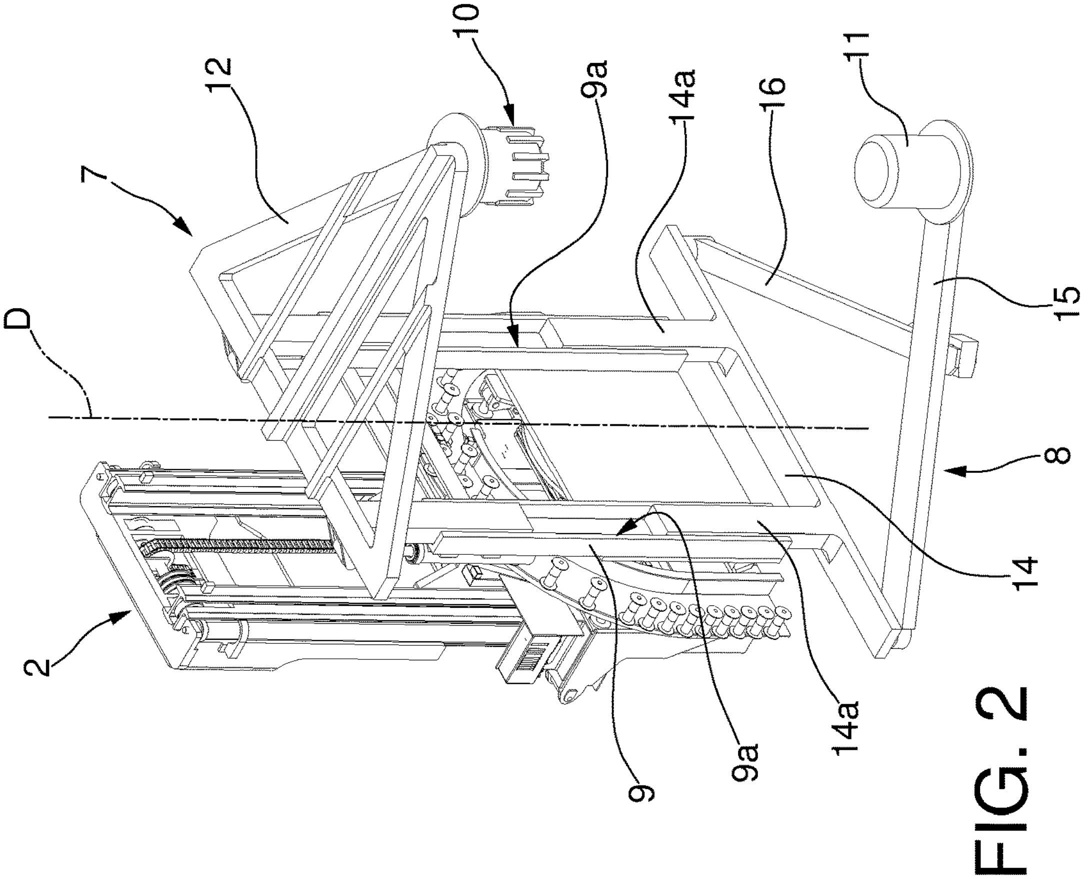
FIG. 2 is another perspective view of the device, detached from the transport vehicle.

In more detail, the first arm 15 and second arm 16 are articulated to the opposite ends of the movable frame 14 (see for example FIG. 3), respectively at a first articulation axis 15*a* and a second articulation axis 16*a*.

The second terminal element 11 is fixed to the first arm 15, at the opposite end to said first articulation axis 15*a*.

The second grip member 8 comprises an actuation mechanism 17, which allows to bring the first arm 15 and second arm 16 respectively from the operative position to the inactive position, and vice versa.

The actuation mechanism 17 comprises, more in detail, an actuator 18 associated with the end of the second arm 16 opposite to the second articulation axis 16*a*; the actuator 18 controls in rotation a pinion 19.

The actuation mechanism 17 also comprises a rack 20 integral with the first arm 15; more in particular, the rack 20 is provided along a longitudinal groove 21 made in the first arm 15.

The pinion 19, associated to the second arm 16, engages with the rack 20 associated to the first arm 15.

Therefore, the controlled rotation of the pinion 19 determines, by engaging with the rack 20, the rotation of the first arm 15 and second arm 16, according to opposite directions, between the two aforementioned inactive and operative positions.

The operation of the device 1 according to the invention is as follows.

In particular, the picking of a reel B with vertical axis S takes place as follows.

The first grip member 8 is in its inactive, minimum bulk position.

The manipulation head 3 is oriented so that the operative axis H is arranged vertically.

The first terminal element 10, in the closed (unexpanded) configuration, is raised above the height of the reel B.

Subsequently, the vehicle V performs the necessary movements to position the operative axis H of the first terminal element 10 so that it will coincide with the axis of symmetry S of the reel B (with a tolerance which is sufficient to allow its insertion in the first opening B2).

The first terminal element 10 is then lowered until entering through the first opening B2; after this, the first terminal element 10 is brought in the expanded configuration, in such a way as to have a grip on the internal surface of the central through hole B1 of the reel B.

Actuators 13*a* are then operated, so as to raise the reel B, grasped by the first terminal element 10, to a level that is sufficient to create the space for the insertion of the second terminal element 11 below the reel B itself.

At this point, the second grip member 8 is brought into its operating position, in such a way that the axis of the second terminal member 11 coincides with the operative axis H of the first terminal element 10.

This is followed by the lowering of the first terminal element 10, so that the second terminal element 11 penetrates through the second opening B3 of the central through hole B1 of the reel B.

At this point, the reel B is firmly grasped and locked, and it can be moved as needed.

The operation of depositing the reel B with vertical axis S takes place by repeating the steps described herein in reverse order.

Figure 13:
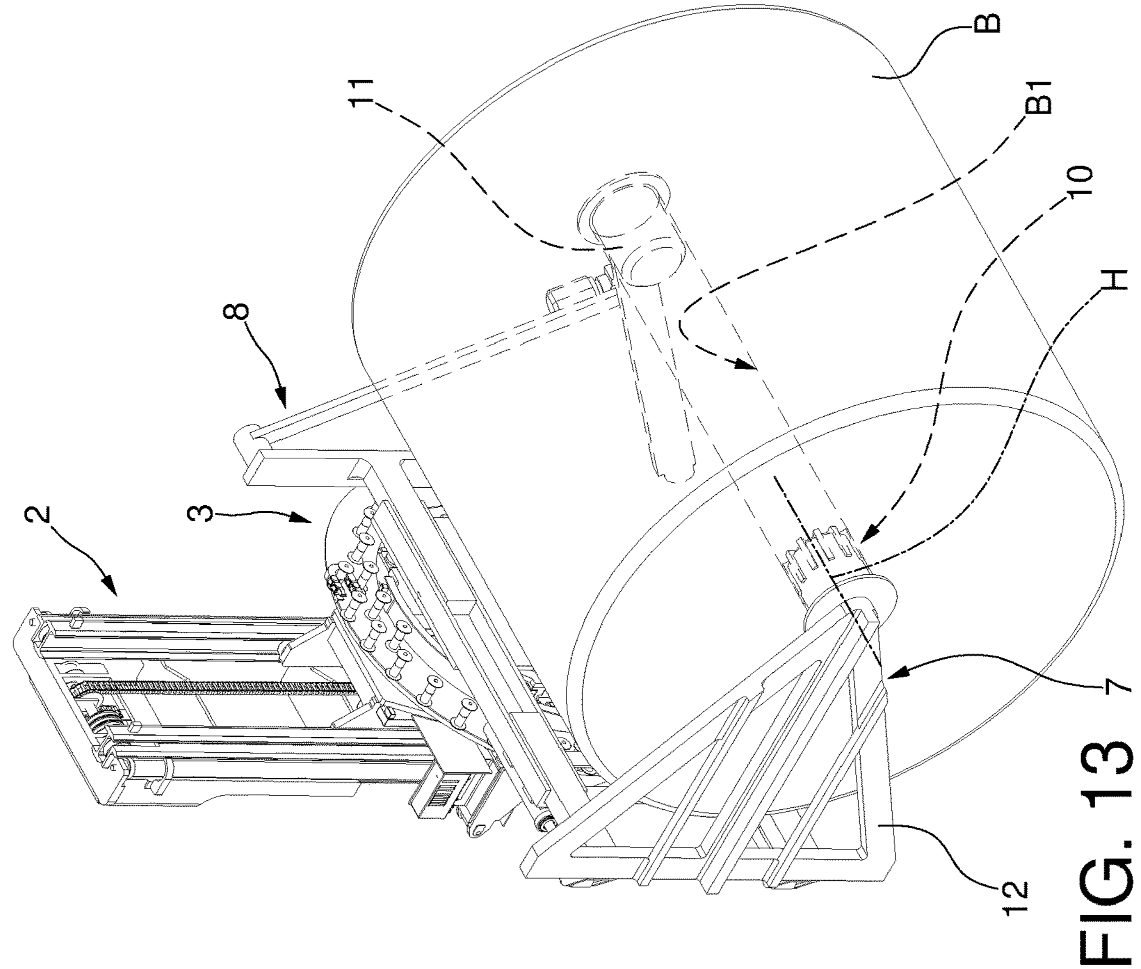
FIG. 13 is a perspective view of the device carrying a reel with horizontal axis orientation.

The picking of a reel B with horizontal axis S (as shown in FIG. 13) instead occurs as follows.

The manipulation head 3 is oriented so that the operative axis H is arranged horizontally.

The second grip member 8, in the respective operative position, is moved in a horizontal plane, until it reaches an external position with respect to the corresponding side of the reel B.

The first terminal element 10 of the first grip member 7 (in the closed, i.e. unexpanded, configuration), is then moved until it reaches an external position with respect to the corresponding side of the reel B.

The first terminal element 10 is subsequently moved, on a plane perpendicular to the axis S of the reel B, until its axis matches the axis of symmetry S of the reel B itself (with a sufficient tolerance to allow its insertion in the central through hole B1). At the same time, the second terminal element 11 is moved in a plane perpendicular to the axis S of the reel B, until its axis matches the axis of symmetry S of the reel B itself (with a sufficient tolerance to allow its insertion in the central through hole B1).

The second terminal element 11 is translated toward the reel B, until it enters the second opening B3 of the central through hole B1; in addition, the first terminal element 10 is translated toward the reel B, until it enters the first opening B2 of the central through hole B1. At this point the first terminal element 10 is brought in the expanded configuration (FIG. 11B, or FIG. 12B), in such a way as to have a grip on the internal surface of the central through hole B1 of the reel B.

At this point, the reel B is firmly grasped and locked, and it can be moved as needed.

The operation of depositing of the reel B with horizontal axis S takes place by repeating the steps described here in reverse order.

The invention thus conceived allows to achieve important technical advantages.

First, the device 1 according to the invention is capable of picking/depositing/manipulating reels having both horizontal and vertical axes, in a very easy manner and without having to perform modifications and/or replacements of parts (for example of different format or size).

In particular, in the case of manipulation of the reel B with horizontal axis, the latter may also be positioned with the orientation of the initial edge in the desired direction.

This versatility is obtained thanks to the fact that the device 1 is able to lift the reels B—for example, with vertical orientation of the axis S—using only the first terminal element 10, while the second grip member 8 is in a minimum bulk position; this lifting then allows to position the second grip member 8 below the reel, with the axis of the second terminal member 11 matching the operative axis H of the first terminal element 10, to lock the reel B in a secure manner for subsequent movements.

Figure 14:
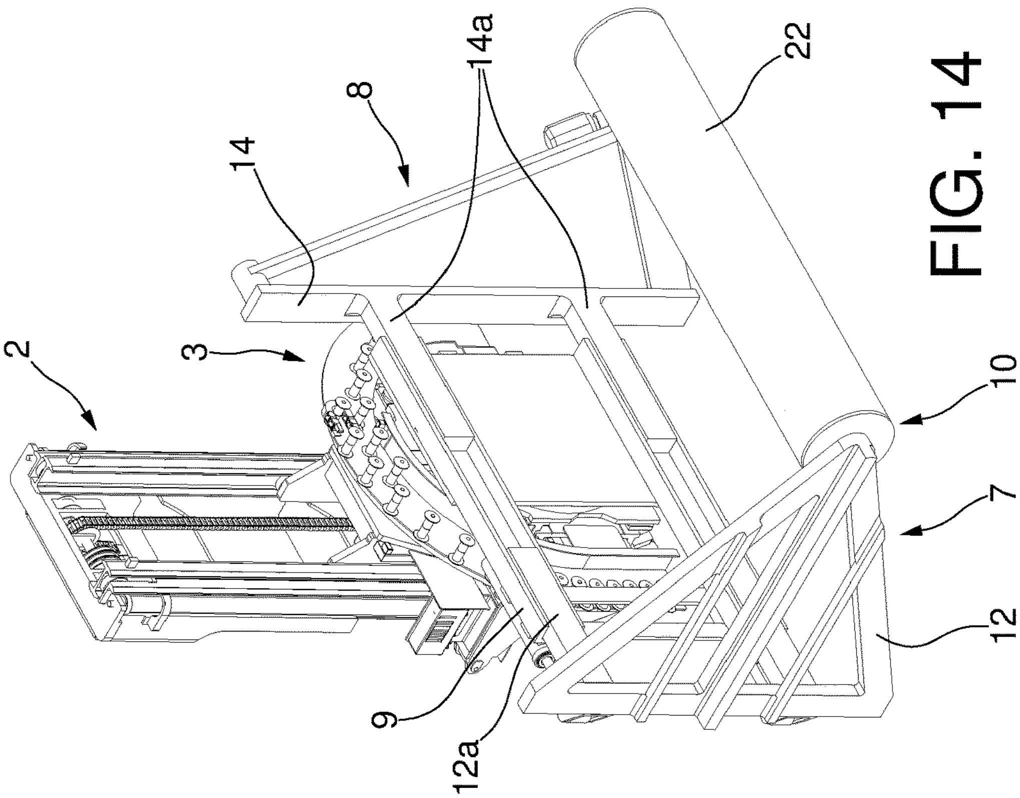
FIG. 14 is a perspective view of the device carrying the core of a reel with horizontal axis orientation.

As shown in FIG. 14, the device 1 is also capable of picking (also in this case, without modifications and/or replacements of parts) a core 22 for supporting a reel B already finished by a machine, for example an unwinding machine or the like.

Thanks to the fact that the reel B is grasped in correspondence of the central through hole B1 and not on its lateral surface, there is no risk of damaging the reel B itself.

Moreover, thanks to the remarkably reduced external bulk of the grip members 7, 8 with respect to the shape of the reel B, it is possible to maximize the available space in the warehouse, during storage or picking operations.

The present invention has been described according to preferred embodiments; however, equivalent variants can be conceived without departing from the scope of protection defined by the following claims.

The invention claimed is:

1. A device for moving reels (B), comprising at least one support upright associable with a transport vehicle (V), and at least one manipulation head for manipulating the reels (B), such manipulation head connected to said support upright, said manipulation head comprising at least one first grip member, provided with a first terminal element adapted to grasp at least one of said reels (B) at a first opening of a central through hole, wherein said first terminal element defines a respective operative axis and can be expanded, with shape that can vary between an inactive configuration, in which said first terminal element can be freely inserted in the first opening of the central through hole of said at least one of the reels (B), and an operative configuration, in which said first terminal element is expanded such to exert a friction grip action on an internal surface of the central through hole, and wherein said manipulation head comprises a second grip member provided with a second terminal element adapted to grasp said at least one of the reels (B) at a second opening (B3) of the central through hole (B1), opposite the first opening (B2), wherein said second grip member is movable between an inactive position of minimum bulk, and an operative position, in which said second terminal element is coaxial with said operative axis of said first terminal element.

2. The device according to claim 1, wherein said first terminal element comprises a body with cylindrical or substantially cylindrical shape, whose axis of symmetry defines said operative axis (H), said first terminal element being provided with a plurality of expandable peripheral elements, movable between an inactive configuration, in which they are housed within said body, and an operative configuration, in which they project with respect to an external surface of said body.

3. The device according to claim 2, wherein said second terminal element has cylindrical or substantially cylindrical shape, with diameter such that it can be inserted in the second opening of the central through hole, with a certain tolerance.

4. The device according to claim 3, wherein said manipulation head comprises a central support, with which said first grip member and said second grip member are slidably associated, said first grip member and second grip member being actuatable to translate along a translation direction (D) parallel to an axis of symmetry (S) of the at least one reel when the latter is grasped by said first, second grip member.

5. The device according to claim 1, wherein said second grip member comprises a movable frame, a first arm and a second arm that are mutually connected, and both connected to said movable frame, in said operative position said first arm and second arm being projectingly positioned with respect to said movable frame, in said inactive position said first arm and second arm being substantially bent on said movable frame.

6. The device according to claim 5, wherein said first arm and said second arm are articulated to opposite ends of said movable frame, respectively at a first articulation axis and at a second articulation axis, said second terminal element being fixed to said first arm at an end opposite the aforesaid first articulation axis.

7. The device according to claim 5, wherein said second grip member comprises an actuation mechanism, adapted to carry said first arm and said second arm from said operative position to said inactive position, and vice versa.

8. The device according to claim 7, wherein said actuation mechanism comprises an actuator, associated with an end of said second arm opposite said second articulation axis, which controls in rotation a pinion, and a rack integral with said first arm and engaging with said pinion.

9. The device according to claim 8, wherein said rack is provided along a longitudinal groove made in said first arm.

10. The device according to claim 1, wherein said at least one support upright comprises a system of actuators adapted to orient and/or position said manipulation head.

11. The device according to claim 1, wherein said at least one support upright comprises means for vertical translation of said manipulation head.

* * * * *